(12) United States Patent
Serra

(10) Patent No.: US 7,357,400 B2
(45) Date of Patent: Apr. 15, 2008

(54) SUSPENSION DEVICE FOR VEHICLE WHEELS

(75) Inventor: Loïc Serra, Tallende (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/357,113

(22) Filed: Feb. 21, 2006

(65) Prior Publication Data

US 2006/0186626 A1    Aug. 24, 2006

Related U.S. Application Data

(63) Continuation of application No. PCT/EP2004/008365, filed on Jul. 27, 2004.

(30) Foreign Application Priority Data

| Aug. 18, 2003 | (FR) | ................................... 03 10022 |
| Dec. 11, 2003 | (WO) | ................ PCT/EP 2003/14066 |
| Jun. 24, 2004 | (FR) | ................................... 04 06930 |

(51) Int. Cl.
    *B62D 17/00*        (2006.01)
(52) U.S. Cl. ........................... 280/86.751; 280/124.134
(58) Field of Classification Search ............ 280/86.75, 280/86.751, 86.757, 5.52, 5.521, 124.134
    See application file for complete search history.

(56) References Cited

U.S. PATENT DOCUMENTS

| 1,686,941 | A | * | 10/1928 | Taylor ....................... 280/6.154 |
| 2,279,120 | A | * | 4/1942 | Hurley ...................... 280/5.509 |
| 2,828,969 | A | * | 4/1958 | Hoffman ................... 280/5.521 |
| 3,150,882 | A | * | 9/1964 | Corbin ................. 280/124.103 |
| 3,309,097 | A | * | 3/1967 | Seeber ...................... 280/5.508 |
| 3,497,233 | A | * | 2/1970 | Bolaski, Jr. ............. 280/86.757 |
| 6,170,838 | B1 | * | 1/2001 | Laurent et al. .......... 280/5.508 |
| 6,267,387 | B1 | * | 7/2001 | Weiss ........................ 280/5.52 |
| 6,279,920 | B1 | * | 8/2001 | Choudhery .............. 280/5.521 |
| 6,406,036 | B1 | * | 6/2002 | Laurent et al. .......... 280/5.509 |
| 6,511,078 | B2 | * | 1/2003 | Sebe ........................ 280/5.509 |
| 6,547,260 | B2 | * | 4/2003 | Laurent et al. .......... 280/5.509 |
| 6,688,620 | B2 |   | 2/2004 | Serra et al. |
| 6,776,426 | B2 |   | 8/2004 | Deal |
| 6,805,362 | B1 | * | 10/2004 | Melcher ..................... 280/5.52 |
| 6,874,793 | B2 | * | 4/2005 | Choudhery .............. 280/5.521 |
| 2001/0028154 | A1 | * | 10/2001 | Sebe ..................... 280/86.757 |
| 2002/0093152 | A1 | * | 7/2002 | Laurent et al. .......... 280/5.521 |
| 2003/0011157 | A1 |   | 1/2003 | Aubarede et al. |
| 2003/0071430 | A1 |   | 4/2003 | Serra et al. |
| 2005/0051976 | A1 | * | 3/2005 | Blondelet et al. ........ 280/5.521 |

* cited by examiner

*Primary Examiner*—Paul N. Dickson
*Assistant Examiner*—Barry Gooden, Jr.
(74) *Attorney, Agent, or Firm*—Buchanan Ingersoll & Rooney PC

(57) ABSTRACT

A vehicle suspension device includes a camber mechanism which imparts to the wheels a degree of freedom of the camber independently of vehicle rolls. The wheels are linked to the suspension elements so that the camber movement of each wheel permits, around a mean position of the wheel, an instantaneous centre of rotation (CIR r/s). A camber connection structure transmits the camber movements of one wheel to another wheel. The instantaneous position of the instantaneous centre of rotation within the camber plane for a zero camber of a wheel satisfies the following condition: $Z \leq (0.75)Y - (0.12158)R$, wherein Z and Y are the ordinate and abscissa, respectively, of the instantaneous position, and R is the wheel radius.

16 Claims, 7 Drawing Sheets

SUSPENSION DEVICE FOR VEHICLE WHEELS

The present application is a continuation of International Application PCT/EP2004/008365 filed on Jul. 27, 2004 and published as WO 2005/21294 on Mar. 10, 2005, and which claims priority of International PCT/EP03/014066 filed on Dec. 11, 2003 and French Applications No. 03/10022 filed Aug. 18, 2003, and No. 04/06930 filed on Jun. 24, 2004, respectively.

BACKGROUND

The present invention concerns the ground contact system of vehicles, in particular suspension devices, and more particularly the steering of the wheels.

International application WO 01/72572 (corresponding to U.S. Pat. No. 6,688,620), describes a wheel support device which allows a degree of freedom of the camber of the wheel relative to the suspension elements. This degree of freedom is controlled either actively, for example by a piston-cylinder unit as a function of driving parameters of the vehicle, or passively by the forces exerted on the wheel. Patent applications EP1 247 663 (corresponding to U.S. Pat. No. 6,776, 426) and EP1 275 534 (corresponding to U.S. Published Application No. 2003/0011157), describe other mechanical principles of a suspension and wheel support device which permit similar operation.

The "wheel plane" means that plane, related to the wheel, which is perpendicular to the wheel axis and passes through the middle of the tyre. The angular position of the wheel plane relative to the body of the vehicle is defined by two angles, the camber angle and the steering angle. The camber angle of a wheel is the angle which, in a transverse plane perpendicular to the ground, separates the wheel plane from the median plane of the vehicle. This angle is positive when the upper part of the wheel is displaced away from the median plane towards the outside of the vehicle, and in this case one speaks generally of "camber" or "positive camber". Conversely, when the said angle is negative, one speaks of "counter-camber" or "negative camber". In what follows, "camber" or "camber angle" will be used interchangeably.

The steering angle of a wheel is that angle which, in a horizontal plane parallel to the ground, separates the wheel plane from the median plane of the vehicle.

The camber plane is the plane in which the camber takes place. It is the vertical plane, transverse relative to the vehicle and passing through the centre of the static contact area. When the steering angle of the wheel is zero, the camber plane contains the axis of the wheel.

In application WO 01/72572, which also sets forth the general context of the invention, it is proposed for passive systems that the instantaneous centre of rotation of the camber movement of the wheel relative to the suspension elements should be located below ground level so-that the transverse forces acting in the contact area generate a torque which tends to tilt the wheel plane in the desired direction (this instantaneous centre of rotation is called the "first instantaneous centre of rotation" in the document WO 01/72572). However, although under that condition the transverse forces generate a torque about the camber axis which tends to tilt the wheel in the desired direction, the efficacy in terms of camber variation is very different depending on the configurations created. However, in practice, the sensitivity of the camber variations as a function of the forces transmitted in the contact area is an important criterion. In effect, it is generally sought to design a suspension system such that the passive camber variation is predictable, stable and satisfactory in terms of maximum inclination. This is particularly important for very high-performance vehicles intended especially for racing. For such vehicles the search for absolute performance involves optimisation of the longitudinal and transverse grip. This optimisation is only possible if the camber angle of the wheel is at all times close to the ideal for the functioning of the tyre. A camber that is ideal in terms of tyre grip is one that makes it possible to optimise the homogeneity of the pressure distribution in the contact area, i.e. which for example allows compensation of the effect, on the pressure distribution in the contact area, of lateral deformations of the tyre when it is working with a slip angle (typically when cornering).

Thus, one objective of the invention is a suspension device with variable camber whose passive function is improved.

SUMMARY OF INVENTION

The invention proposes for this a vehicle suspension device comprising camber means which impart to the wheels of radius "R" a degree of freedom of the camber relative to the suspension elements, the wheels being linked to the suspension elements so that the camber movement of each wheel permits, around a mean position of the wheel, an instantaneous centre of rotation, the device comprising camber connection means which make it possible to couple the camber movements of one wheel with those of the other wheel and also being configured so that, Y and Z being the abscissa and ordinate of the instantaneous position of the instantaneous centre of rotation in the camber plane respectively, the instantaneous position, for a zero camber of the wheel, satisfies the following condition: $Z \leq 0.75*Y - 0.12158*R$.

Preferably, the suspension device of the invention is configured so that said condition is also satisfied during a camber deflection of 0° to −1°, still more preferably of 0° to −2°, still more preferably of 0° to −3°, still more preferably of 0° to −4°, still more preferably of 0° to −5° and so on within the limit of the envisaged camber deflection.

Preferably, the device is configured such that the position of the instantaneous centre of rotation, for a camber of −1°, also satisfies the following condition: $Z \leq 0.75*Y - 0.1562*R$.

Preferably, the device is configured such that the position of the instantaneous centre of rotation, for a camber of −2°, also satisfies the following condition: $Z \leq 0.75*Y - 0.1908*R$.

Preferably, the device is configured such that the position of the instantaneous centre of rotation, for a camber of −3°, also satisfies the following condition: $Z \leq 0.75*Y - 0.2255*R$.

Preferably, the device is configured such that the position of the instantaneous centre of rotation, for a camber of −4°, also satisfies the following condition: $Z \leq 0.75*Y - 0.2601*R$.

Preferably, the device is configured such that the position of the instantaneous centre of rotation, for a camber of −5°, also satisfies the following condition: $Z \leq 0.75*Y - 0.2947*R$.

In effect, it emerged surprisingly that the displacement of the instantaneous centre of rotation during the camber movement must be contained within limits which are the narrower, the larger is the useful camber range envisaged.

Preferably, the suspension device according to the invention is also configured such that, for a zero camber of the wheel, the instantaneous centre of rotation is located substantially at the level of the ground and at a distance "d" from the wheel plane towards the inside of the vehicle. Thus, the camber variations are essentially a function of the vertical forces acting on the wheel in the contact area, that is to say, variations in load.

Preferably, the device is also configured such that, for a zero camber of the wheel, the instantaneous position satisfies the following condition: Y>0.125*R. Still more preferably, the device is also configured such that, for a zero camber of the wheel, the instantaneous position satisfies the following condition: Z≧−0.75*Y+0.12158*R Preferably, the camber means comprise a wheel carrier and rods articulated in their lower parts to the suspension elements and in their upper parts to the wheel carrier.

Preferably, the suspension device also comprises locking means in order to permit blocking of the camber movement as a function of, for example, the transverse acceleration to which the vehicle is subjected.

According to one preferred embodiment of the invention, the camber means imparting a degree of freedom of camber relative to the suspension elements to the wheel carrier comprise a triple hinge which operates in three substantially longitudinal axes and is linked on the one hand to the wheel carrier and on the other hand to the suspension elements as described in International Application PCT/EP2003/014937.

The invention also relates to a vehicle comprising such a suspension device.

DESCRIPTION OF THE DRAWINGS

The present description will be better understood on reading the attached figures which illustrate the invention in particular on the basis of the mechanical principles set forth in application WO 01/72572. These examples are naturally non-limiting.

DESCRIPTION OF PREFERRED EMBODIMENTS

Figure 1:
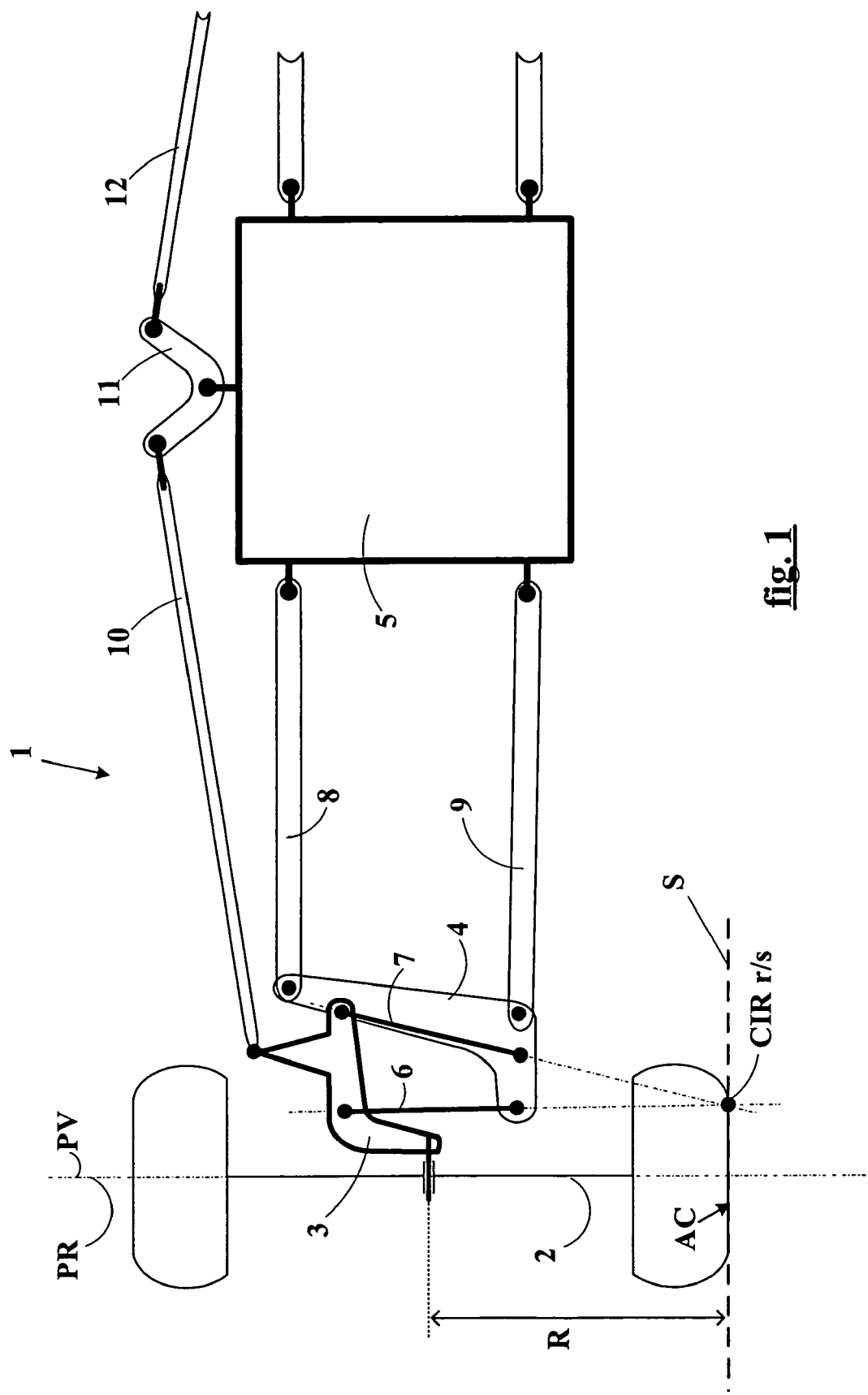
FIG. 1 is a longitudinal plan view representing diagrammatically the principle of a suspension device according to the invention.

In FIG. 1 there is shown a suspension device 1 according to the invention. The device comprises different elements intended to guide the plane PR of a wheel 2, relative to the body 5 of a vehicle. The wheel 2, of radius "R", rests on the ground S via its contact area AC. The radius R (also referred to as the "loaded radius") is the distance between the ground S and the wheel axis when the wheel is vertical (zero camber) and is supporting its rated static working load. The wheel carrier 3 is connected to the body 5 by means (4, 6, 7, 8, 9) which allow it two degrees of freedom. The camber movement of the wheel 2 is allowed by a connection of the wheel carrier 3 to the intermediate support 4 via pivoting rods 6 and 7 articulated at their bottom ends to the suspension elements (4, 8, 9) and at their top ends to the wheel carrier 3. The suspension deflection movement is allowed by a connection of the intermediate support 4 to the body 5 by upper 8 and lower 9 fixed-length arms (or triangles). Thus, the suspension device 1 is configured so as to confer on the wheel carrier, relative to the body 5, on the one hand a degree of freedom of the camber since the wheel carrier can tilt relative to the suspension elements and consequently relative to the body, and on the other hand a degree of freedom of the suspension deflection since the wheel carrier can undergo substantially vertical movements in a manner known as such, for example in the manner of "multi-link" or "double wishbone" systems. The suspension spring or other device that supports the load has not been shown here.

Furthermore, the suspension system of the invention comprises connection means (10, 11, 12) which couple the camber movements of the wheel 2 with those of the opposite wheel (not shown). The connection means may adopt, for example, the form shown here of a push rod 10 controlled by the wheel carrier 3 and acting by means of a rocker 11 on an opposing push rod 12 connected to the wheel carrier of the opposite wheel. The geometric configuration of the push rods and of the rocker may be adapted in order to obtain a given behaviour of the camber of one wheel relative to the other as a function of the direction of variation. In effect, it may for example be advantageous to obtain a different variation of the camber of each wheel (inner and outer) in a curve. One principle of the invention is to combine the energy transmitted by the ground to each wheel in order to obtain a coherent variation of the camber of the two wheels of the axle independently of the proportion of energy transmitted to each wheel in isolation. Blocking or control means may also act on this connection. For example, a locking device may prevent the camber movements below a given threshold of transverse acceleration in order to stabilise the vehicle in a straight line.

The camber movement of the wheel 2 (or of the wheel carrier 3) relative to the intermediate support 4 allows an instantaneous centre of rotation (CIR r/s). In this embodiment, the position of this instantaneous centre of rotation is determined by the intersection of the axes of the rods 6 and 7 connecting the wheel carrier 3 to the intermediate support 4. FIG. 1 shows the suspension device in a mean position of the wheel corresponding to the static position of the suspension device when the vehicle is carrying its rated load on flat ground. Here the static camber is represented as essentially zero, i.e. the wheel plane PR corresponds to the vertical plane PV passing through the centre of the contact area AC and parallel to the median plane of the vehicle.

According to one preferred embodiment of the invention, the instantaneous centre of rotation of the camber movement of the wheel relative to the suspension elements (CIR r/s) is located in this mean position at a distance "d" from the wheel plane PR and substantially at the level of the ground. This is shown diagrammatically in FIG. 2. In this preferred embodiment, the camber variations are essentially linked to the variations in the vertical forces (Fz) acting on the wheel in the contact area (AC). On a racing car, a distance "d" of the order of 40 mm may in this case be sufficient to obtain the desired camber variations on bends. Still more preferably, the instantaneous centre of rotation remains contained in the sector A during the intended camber deflection.

Figure 2:
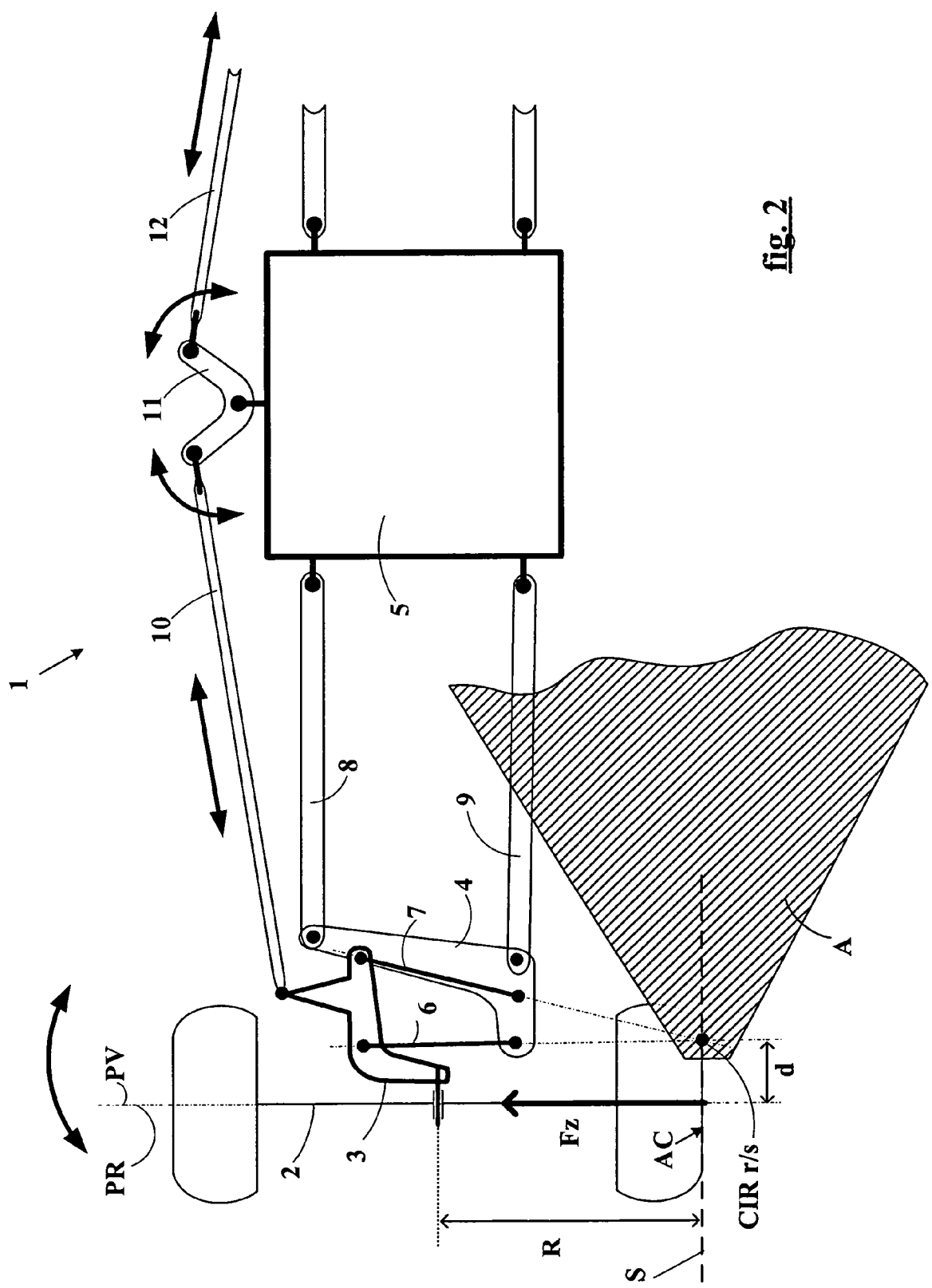
FIG. 2 is a longitudinal plan view representing diagrammatically of a preferred embodiment of the suspension device according to the invention.

It can clearly be seen in FIG. 2 that the vertical load Fz carried by the wheel creates a torque which tends to make the wheel carrier 3 pivot about the instantaneous centre of rotation (CIR r/s), towards the inside of the vehicle, but the connection means (10, 11, 12) prevent any camber movement as long as the vertical load carried by the opposite wheel is identical. When the load carried by one wheel increases relative to the load carried by the other, the wheels tilt, towards the inside of the vehicle for the more loaded wheel and towards the outside for the other wheel. This preferred embodiment of the suspension system of the invention is thus sensitive to the relative variation of the load carried by each wheel of the axle, that is to say to what is commonly referred to as the "load transfer". The fact that this transfer of load generally induces rolling of the body is not pertinent. Furthermore, even in the absence of roll (for example in the case of a vehicle without suspension or one fitted with an active suspension capable of compensating for the roll), the desired camber variation does in fact occur. One additional advantage of this embodiment of the invention is that it may be insensitive to very large variations in aerodynamic load on certain vehicles, in particular in racing. The connection permitting an instantaneous centre of rotation at the level of the ground must of necessity be a virtual one (for example by a rod system 6 and 7) but in the upper part of zone A, camber variation systems having a material fixed pivot may be adopted.

Figure 3:
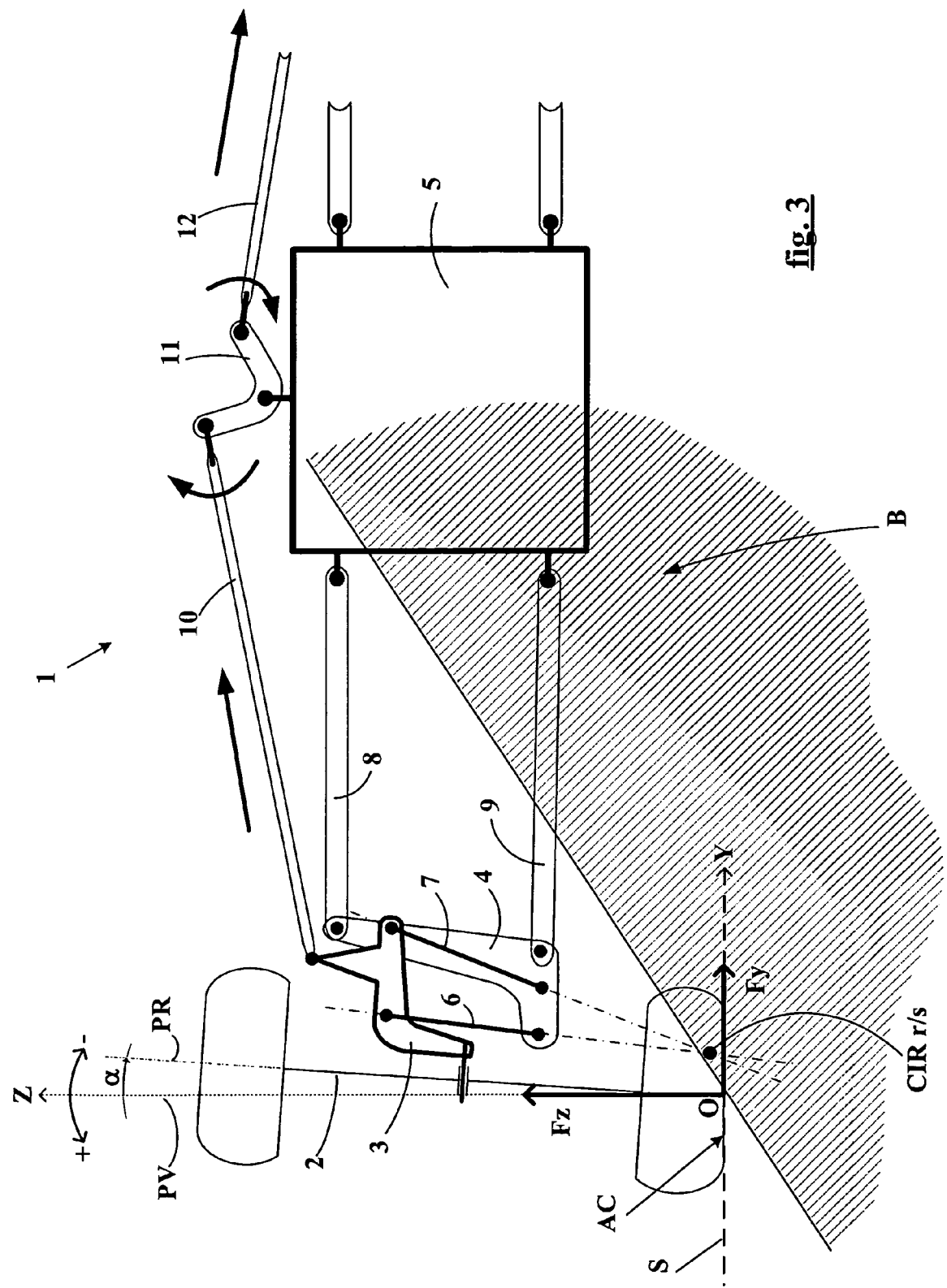
FIG. 3 is a longitudinal plan view representing diagrammatically of the principle of a suspension device according to the invention when the wheel camber is varying.

FIG. 3 shows the embodiment of FIG. 1 when the wheel 2 adopts a negative camber angle $\alpha$ (counter-camber). In effect, the wheel plane PR is tilted towards the inside of the vehicle at an angle $\alpha$ relative to the vertical reference plane PV. This inclination can be caused by the combination of a vertical force Fz and a transverse force Fy applied within the contact area AC. In FIG. 3, Fy is oriented towards the inside of the vehicle. This corresponds for example to the case of the bend outside wheel when the vehicle follows a curved path. However, the camber of the wheel 2 is also a function of the forces exerted on the other wheel of the axle owing to the camber connection means (10, 11, 12).

According to the invention, the zone B represents the part of the camber plane in which the instantaneous centre of rotation (CIR r/s) of the degree of freedom of camber must be located when the wheel is in its mean position at zero camber. This characteristic is explained in detail below in the description of FIG. 4.

The camber movements of the wheel carrier can also be "simulated", i.e. imposed by forces applied to the wheel or directly to the wheel carrier 3 while the intermediate support 4 is held fixed relative to the body 5 and to the ground S. This allows the kinematic operation of the suspension system to be checked, measured and analysed. As has been seen, in this example, the instantaneous centre of rotation (CIR r/s) is the point of intersection of the axes of the rods (6, 7) which define the kinematics of the movements of the wheel carrier 3 relative to the intermediate support 4. The position of this point is variable during camber movements of the wheel carrier, as can be seen by comparing for example FIGS. 2 and 3.

Figure 4:
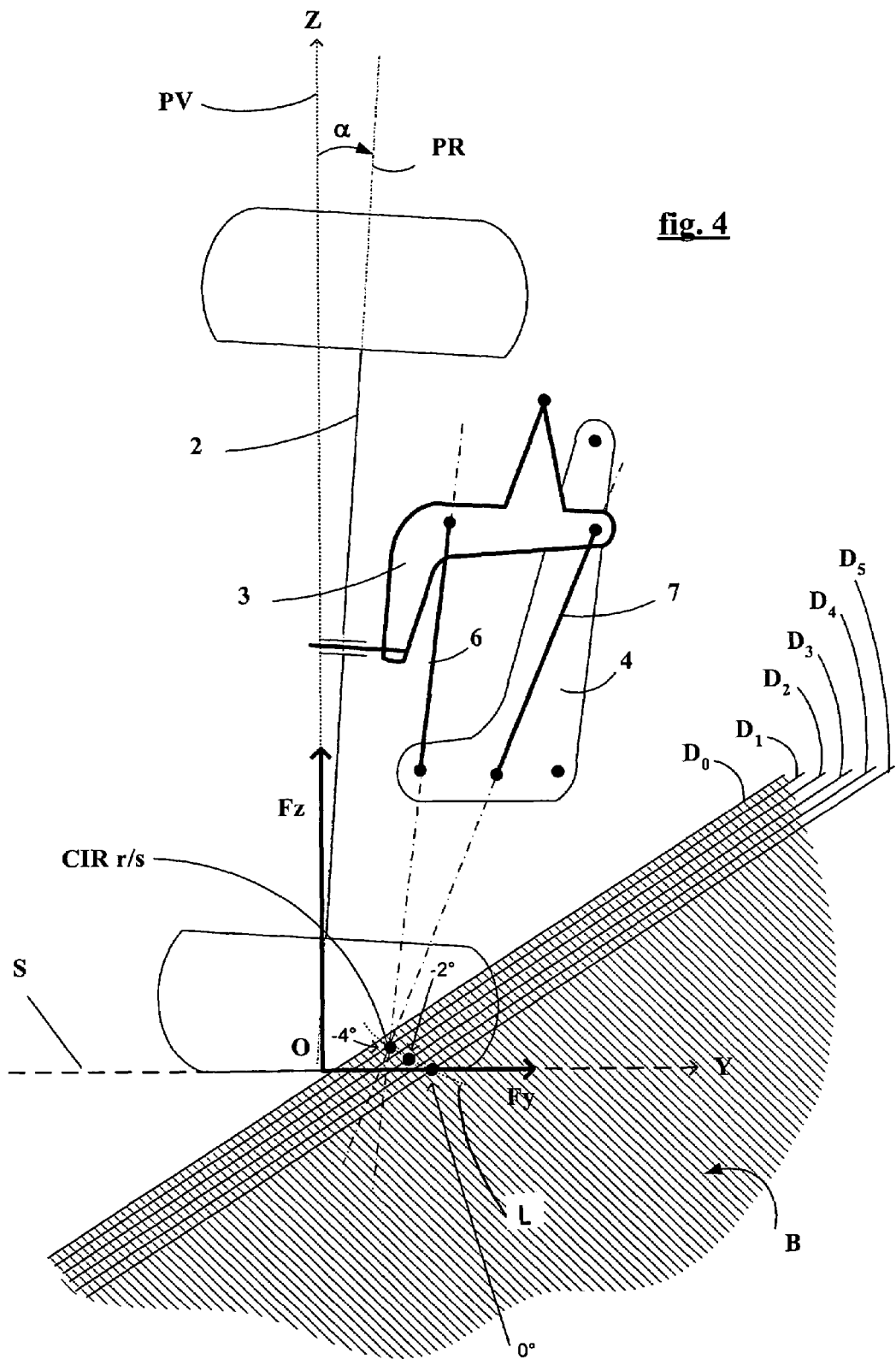
FIG. 4 is an enlargement of part of FIG. 3.

FIG. 4 makes it possible to illustrate the preferred characteristics of the invention in greater detail. A broken line L has been used to show the displacement or evolution of the position of the instantaneous centre of rotation (CIR r/s) during the camber deflection in FIG. 4. According to a preferred characteristic of the invention, the support device is configured such that the evolution of the instantaneous centre of rotation is contained in a well-defined portion of the camber plane. This part B of the camber plane is limited by a straight line "$D_0$". This part B of the plane is in fact a half-plane. In the remainder of the present description, such a portion of the plane will therefore be denoted by the term "half-plane". A given half-plane is thus a part of the camber plane in which, according to the invention, the instantaneous centre of rotation should be situated for a given camber angle or during a given camber deflection.

FIG. 4 also represents, in the camber plane, the orthogonal scale (OY, OZ) used to express, using Cartesian coordinates, the preferred characteristics of the invention with regard to the positions of the instantaneous centre of rotation (CIR r/s). This scale is centred on the one hand upon the vertical plane PV (equivalent to the wheel plane PR when the latter is vertical, see FIG. 1) and on the other hand upon the plane of the ground S. Thus, the abscissa Y corresponds to the horizontal position relative to the reference plane PV and the ordinate Z corresponds to the vertical position relative to the ground S. The abscissa Y is positive towards the inside of the vehicle and negative towards the outside. The ordinate Z is positive when the point considered is above the ground S and negative when it is below ground level. In this scale the profiles of the rods 6 and 7 can be marked. The rods are articulated at the bottom to the suspension elements (4) and at the top to the wheel carrier 3. As was seen earlier, the movement of the upper part of the rods creates the degree of freedom of the camber of the wheel carrier relative to the suspension elements. The camber movement of the wheel carrier takes place around the instantaneous centre of rotation (CIR r/s) whose position evolves at every moment during the camber movement. Thus, the position of the instantaneous centre of rotation corresponds, throughout the camber movement, to varying coordinates Y and Z. This variation depends on the position and orientation of the rods in the camber plane. The graph (in the same way as the preceding figures) can represent a rear view of the left-hand part of the suspension of a vehicle according to the invention. The inside of the vehicle will then be on the right of the figure, and the outside on the left. A broken line has been used diagrammatically in FIG. 4 to show the evolution curve of the instantaneous centre of rotation. On this curve are plotted the points corresponding to the position of the instantaneous centre of rotation for camber angles of 0°, −2° and −4°. The positions of the wheel 2, the wheel carrier 3 and the rods 6 and 7 are shown for a camber of −4°.

In this illustration, the half-plane B is that part of the camber plane defined by the straight line $D_0$. The oblique line $D_0$ contains all points of the type Z=aY+b, "a" being the slope of $D_0$ and "b" being the ordinate at the origin of $D_0$. The half-plane B can thus be defined by the following inequality: $Z \leq aY+b$ The half-plane B defined by the straight line $D_0$ represents diagrammatically that part of the camber plane in which, according to the invention, the instantaneous centre of rotation must be situated for a zero camber ($\alpha$=0) of the wheel.

Preferably, the half-plane B also represents that part of the camber plane in which, according to the invention, the instantaneous centre of rotation must be situated during a camber deflection of 0° to −1°.

If the device is designed to have a useful camber deflection covering at least the range from 0° to −2°, the half-plane B is also that part of the camber plane in which the instantaneous centre of rotation should preferably be situated during a camber deflection from 0° to −2°.

If the device is designed to have a useful camber deflection covering at least the range from 0° to −3°, the half-plane B preferably is also that part of the camber plane in which the instantaneous centre of rotation should be located during a camber deflection from 0° to −3°, and so on.

This graphical representation method allows clear visualisation of the significance of the characteristics concerning the evolution of the various positions of the instantaneous centre of rotation. The representation is entirely equivalent to the criteria used in the claims of the present application, which are expressed in the form of conditions relating to the Cartesian coordinates (horizontal Y and vertical Z) of the instantaneous centre of rotation in the camber plane.

The various sectors and the zone are open, i.e. they extend to infinity. Consequently, the further the instantaneous centre of rotation of a configuration is located below ground level and/or towards the inside of the vehicle, the larger can be the evolution that is acceptable according to the preceding criteria. However, secondary criteria such as the track or half-track variation, the bulk or the mass of the system will deter those with knowledge of the field from choosing configurations in which the instantaneous centre of rotation is too far away from ground level.

According to the invention, the instantaneous centre of rotation is preferably located in the half-plane B throughout a camber deflection. However, if the deflection of the device is limited by a stop or structural constraint with the same effect, the basic geometrical configuration of the support device (in particular the position and orientation of the rods) must preferably still satisfy the conditions expressed by the half-plane B, i.e. the deflection considered can be in part theoretical or virtual.

Again schematically, the limits $D_1$, $D_2$, $D_3$, $D_4$ and $D_5$ of the half-planes B corresponding to the instantaneous centre of rotation position characteristics for given counter-camber angles, respectively of $-1°$, $-2°$, $-3°$, $-4°$ and $-5°$ are shown. The configuration represented satisfies the criterion corresponding to the limit $D_2$ since the position of the instantaneous centre of rotation for a camber of $-2°$ lies within the half-plane B limited by $D_2$. On the other hand, in this example the position for a camber of $-4°$ is not contained in the half-plane B limited by the corresponding straight line ($D_4$).

Figure 5:
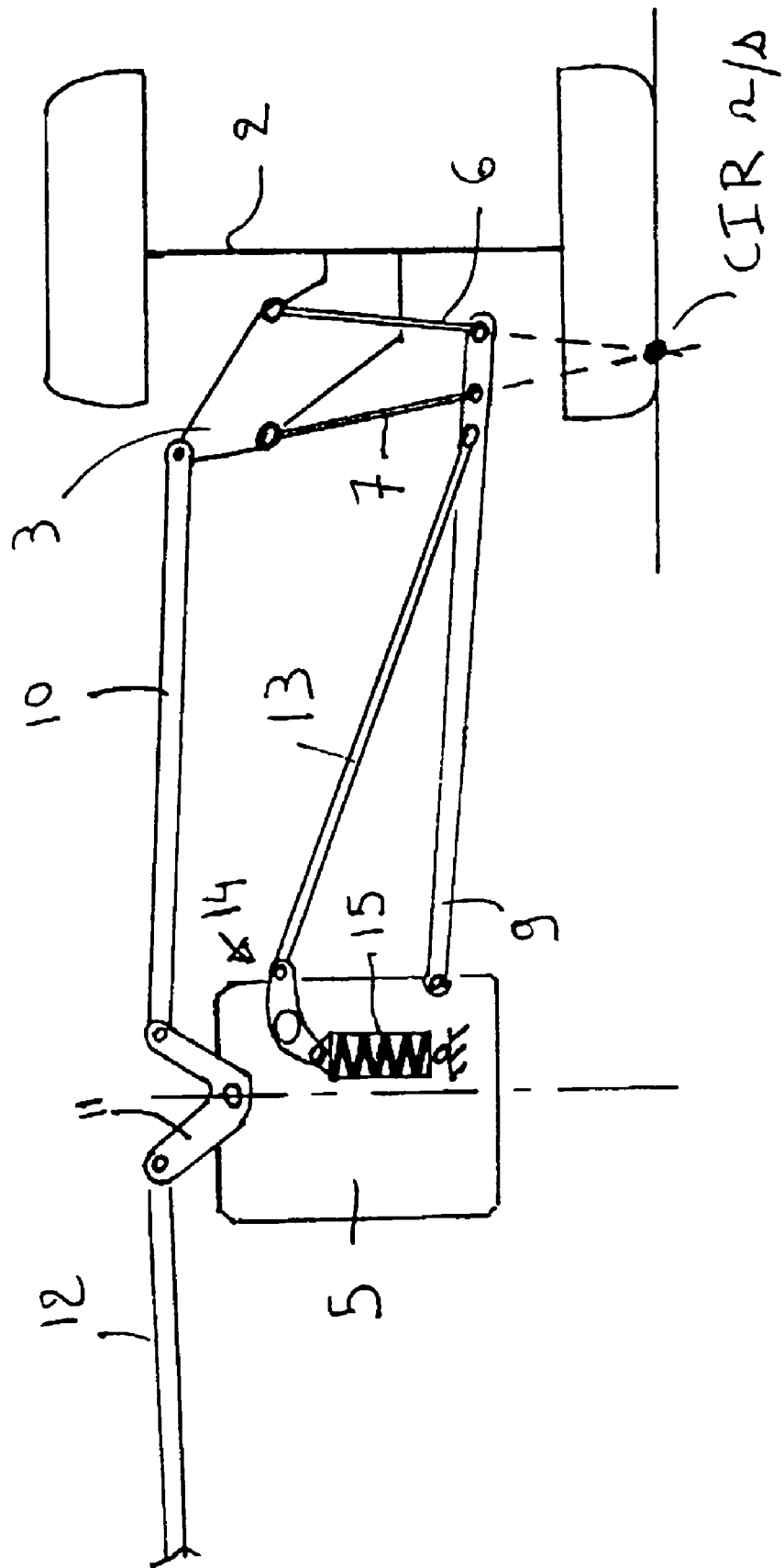
FIGS. 5, 6 and 7 represent diagrammatically a longitudinal plane view of examples of embodiment of the suspension device according to the invention.

What has been described above for the half-plane B can be transposed to the definition of the part A of the camber plane illustrated in FIG. 2. In fact, this part A which can be regarded as a truncated sector of the camber plane is limited by three straight lines. The sector A of the camber plane can thus for example be defined by the following conditions on the abscissa (Y) and ordinate (Z) of the position of the instantaneous centre:

$Y > 0.125 * R$ $Z \leq 0.75 * Y - 0.12158 * R$ $Z \geq -0.75 * Y + 0.12158 * R$ In FIG. 5 there is shown another embodiment of the invention. In this example, the function of the intermediate support (referenced 4 in FIG. 1) is provided directly by the lower arm 9. This arm may be trapezoidal (A-shaped) or L-shaped and thus take up all the forces with the exception of the vertical force (Fz). In other words, such an arm is articulated by one pivot connection to the body 5 and by another pivot connection to the wheel carrier 3. Alternatively, the longitudinal, spinning and/or steering forces may be taken up by a push rod 10 which itself is in the form of a triangle or a trapezium. In this case, the lower arm 9 can then be connected to the body merely by a ball-joint connection (and not a pivot connection). In both cases, the vertical load is taken up by a pusher system ("push rod" 13) and transmitted to a spring 15 by means of a rocker 14. The other elements are taken from FIG. 1 without modification.

Figure 6:
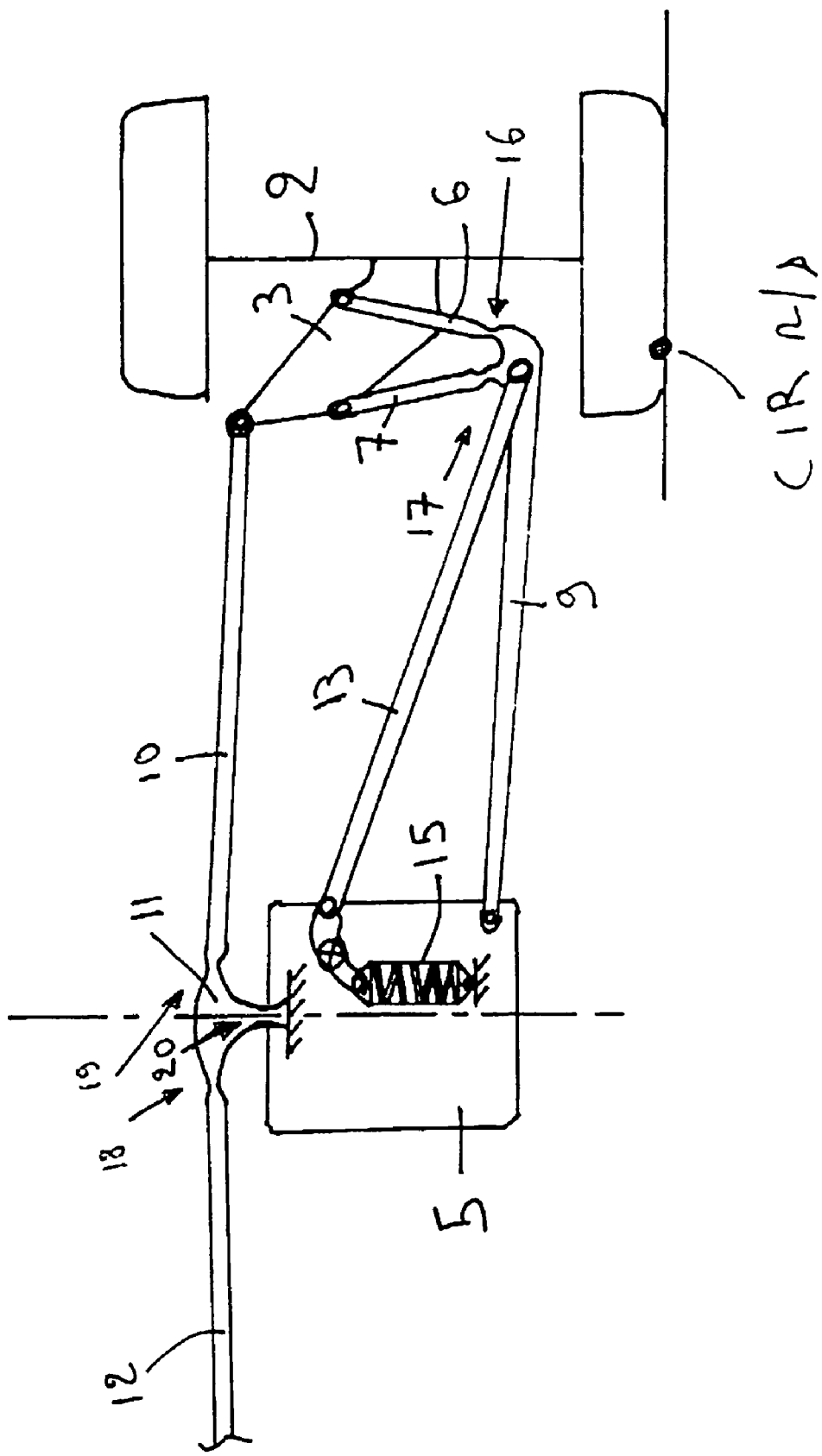

In FIG. 6 there is shown another embodiment of the invention. In this example, a certain number of pivot connections is provided by flexible zones provided on monobloc pieces. For example, here the rods 6 and 7 are extensions integral with the lower arm 9. The flexible zones (16 and 17) located at the lower ends of the rods make it possible to define an instantaneous centre of rotation (CIR ris) at the level of the ground. Likewise, the push rods 10 and 12 and the rocker 11 are connected to each other and to the body 5 by flexible zones (18, 19, 20) to form a single piece. The other elements are taken from FIG. 5 without modification.

Figure 7:
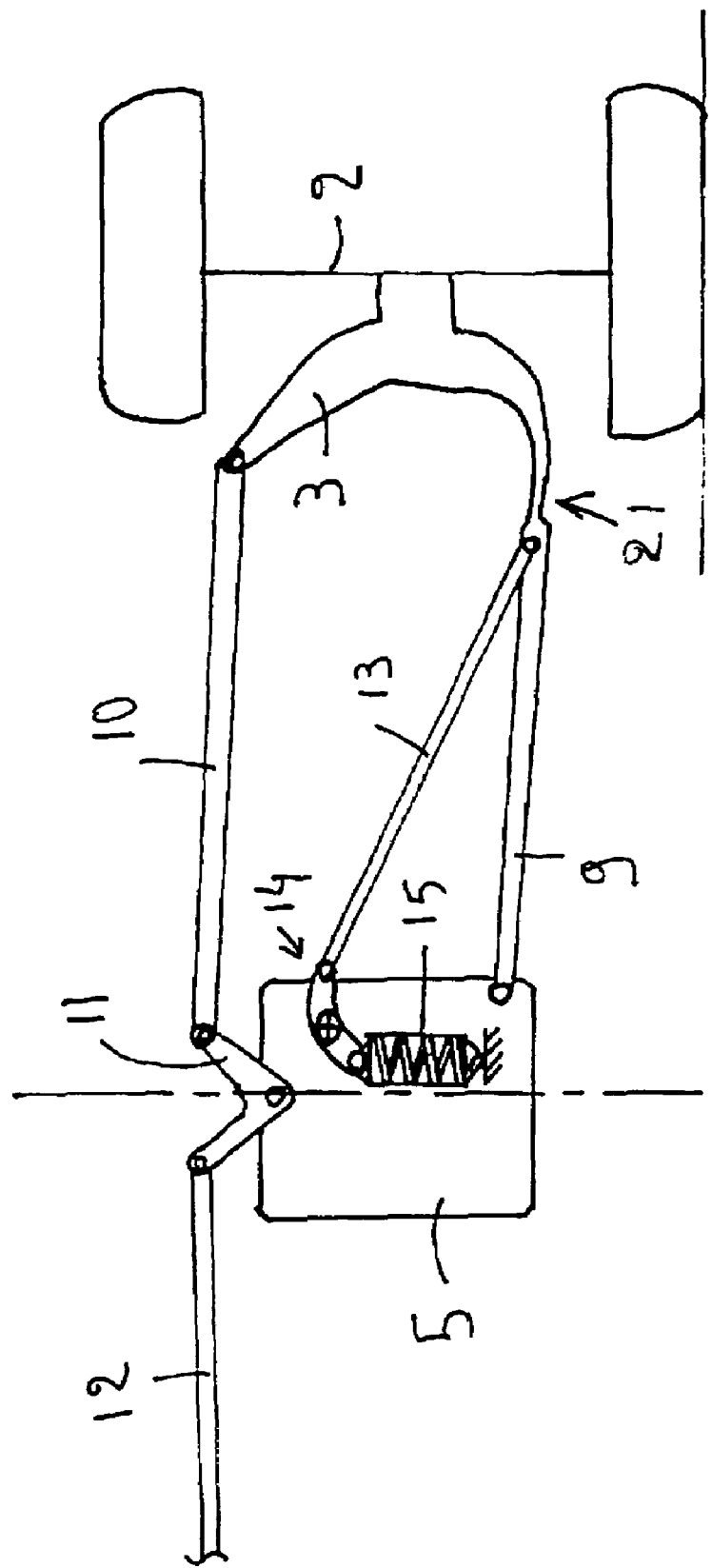

In FIG. 7 there is shown another embodiment of the invention. It differs mainly from that of FIG. 4 by its method of connection between the suspension elements and the wheel carrier. Here, the pivot connection of the wheel carrier 3 with regard to the lower arm 9 (which constitutes the intermediate support as in FIGS. 5 and 6) is controlled by a flexible zone (21). Thus, the rods are dispensed with and the wheel carrier 3 is integral with the arm (or trapezium) 9. The precise definition of the instantaneous centre of rotation (CIR r/s) then depends in particular on the geometry of the flexible zone (21).

One interesting feature of the invention is that it is applicable to all the known suspension designs, since supplementary elements can be added to these existing systems which allow a degree of freedom of the camber over and above the existing degree of freedom of the suspension. For example, the invention can of course be applied on the basis of MacPherson suspension systems or derivatives as described in application WO 01/72572 and in particular FIGS. 2 and 3 of that document. In this case the lower portion of the strut constitutes the intermediate support to which the wheel carrier is articulated. The principles of the invention can also be applied in combination with the camber means described in patent applications EP1247663, EP1275534, WO2004/058521, FR2002/16947, FR2002/15685 or WO2004/052666.

The camber connection means (10, 11, 12) are preferably simple mechanical means such as those described in the figures of the present application. However, different means, for example using hydraulic or electric jacks the movements of which are interconnected may be used and have advantages for example in terms of bulk.

The suspension system of the invention may be implemented on a steering or non-steering, driving or non-driving, axle. In particular, it has a certain advantage in car racing and in the sports vehicle market.

To check that a support or suspension device satisfies a given criterion concerning the variation of the position of its instantaneous centre of rotation, the following method can be used:

1) Determining the geometry of the system when the suspension is carrying its rated static load, i.e. noting the position in the camber plane of the articulation points of the rods, of the wheel plane PR and of ground level S and measuring the loaded radius R (for a zero camber angle and a tyre at its normal working pressure).

2) Constructing the evolution curve of the instantaneous centre of rotation in the camber plane. This can be done for example theoretically from the configuration determined in stage 1. It can also be done experimentally by artificially imposing the camber variation on the wheel carrier so as to sweep the camber deflection aimed at (for example, from 0° to −3°) and at the same time noting the positions of the rods, so that the corresponding positions of the instantaneous centre of rotation can then be deduced from them. To apply the experimental method, the intermediate support (or if applicable the lower triangle) must be kept immobile relative to the ground S and to the reference plane PV for example by fixing it to a measuring table (marble). The wheel or tyre is then advantageously taken off. The experimental method may be limited by the presence of abutments or other design constraints. In that case the theoretical method must be used, at least for the inaccessible part of the deflection concerned.

3) Comparing the evolution so defined graphically or numerically with the criteria determined as a function of the radius R found.

What is claimed is:

1. A vehicle suspension device for a wheeled vehicle having wheels affixed to respective wheel carriers, each wheel suspended by first ends of respective suspension elements; the device comprising an intermediate support pivotably connected to the first ends of the suspension elements, and a camber mechanism for imparting to each wheel a degree of freedom of the camber relative to the suspension elements, the camber mechanism pivotably interconnecting the wheel carrier with the intermediate support, wherein the wheel carrier and the camber mechanism are movable relative to the intermediate support for changing the camber; the wheel linked to the suspension elements through the wheel support, the camber mechanism and the intermediate support so that the camber movement of each wheel relative to the intermediate support occurs for a mean position of the wheel about a position of an instantaneous centre of rotation; the camber mechanism including a camber interconnection structure for transmitting the camber movements of a wheel to another wheel, wherein the position of the instantaneous centre of rotation within the camber plane for a zero wheel camber satisfies the following condition:

$$Z \leq (0.75)Y - (0.12158)R$$

wherein Z is the ordinate of the position of the instantaneous centre of rotation; Y is the abscissa of the position of the instantaneous centre of rotation; and R is the wheel radius.

2. The device according to claim 1 wherein said condition is satisfied for a camber deflection in the range of 0° to −1°.

3. The device according to claim 1 wherein said condition is satisfied for a camber deflection in the range of 0° to −2°.

4. The device according to claim 1 wherein said condition is satisfied for a camber deflection in the range of 0° to −3°.

5. The device according to claim 1 wherein said condition is satisfied for a camber deflection in the range of 0° to −4°.

6. The device according to claim 1 wherein said condition is satisfied for a camber deflection in the range of 0° to −5°.

7. The device according to claim 1 wherein the position of the instantaneous centre of rotation within the camber plane for a camber deflection of −1° satisfies the following condition:

$$Z \leq (0.75)Y - (0.1562)R.$$

8. The device according to claim 1 wherein the position of the instantaneous centre of rotation within the camber plane for a camber deflection of −2° satisfies the following condition:

$$Z \leq (0.75)Y - (0.1908)R.$$

9. The device according to claim 1 wherein the position of the instantaneous centre of rotation within the camber plane for a camber deflection of −4° satisfies the following condition:

$$Z \leq (0.75)Y - (0.2601)R.$$

10. The device according to claim 1 wherein for a zero camber of the wheel, the instantaneous centre of rotation is located at ground level and at a distance from the wheel plane (PR) towards the inside of the vehicle.

11. The device according to claim 1 wherein the instantaneous centre of rotation within the camber plane for a zero camber also satisfies the following condition:

$$Y > (0.125)R.$$

12. The device according to claim 1 wherein the instantaneous centre of rotation within the camber plane for a zero camber also satisfies the following condition:

$$Z \leq (-0.75)Y + (0.12158)R.$$

13. The device according to claim 1 wherein the camber mechanism comprises a wheel carrier and rods; each rod including an upper end articulated to the wheel carrier, and a lower end articulated to the suspension elements.

14. The device according to claim 1 further comprising a locking mechanism for blocking the camber movement.

15. A vehicle comprising wheels suspended by suspension elements, and a suspension device according to claim 1.

16. A vehicle according to claim 1 wherein each suspension element for a respective wheel is of fixed length.

* * * * *